US011021205B2

(12) United States Patent
Johnson et al.

(10) Patent No.: US 11,021,205 B2
(45) Date of Patent: Jun. 1, 2021

(54) ELECTRONIC CLUTCH ASSIST APPARATUS

(71) Applicant: Alive! Infinity LLC, West Manchester, OH (US)

(72) Inventors: Alex Johnson, West Manchester, OH (US); Aaron Overholser, Bradford, OH (US)

(73) Assignee: ALIVE! INFINITY LLC, West Manchester, OH (US)

( * ) Notice: Subject to any disclaimer, the term of this patent is extended or adjusted under 35 U.S.C. 154(b) by 0 days.

(21) Appl. No.: 16/635,008

(22) PCT Filed: Aug. 8, 2018

(86) PCT No.: PCT/US2018/045757
§ 371 (c)(1),
(2) Date: Jan. 29, 2020

(87) PCT Pub. No.: WO2019/032674
PCT Pub. Date: Feb. 14, 2019

(65) Prior Publication Data
US 2020/0156731 A1  May 21, 2020

Related U.S. Application Data

(60) Provisional application No. 62/563,132, filed on Sep. 26, 2017, provisional application No. 62/542,753, filed on Aug. 8, 2017.

(51) Int. Cl.
*B62K 23/06* (2006.01)
*B62K 11/14* (2006.01)
(Continued)

(52) U.S. Cl.
CPC .............. *B62K 23/06* (2013.01); *B62K 11/14* (2013.01); *F16D 28/00* (2013.01); *F16D 48/06* (2013.01);
(Continued)

(58) Field of Classification Search
CPC ......... B62K 11/14; B62K 23/06; F16D 23/12; F16D 28/00; F16D 48/06;
(Continued)

(56) References Cited

U.S. PATENT DOCUMENTS 3,910,388 A   10/1975   Moori
5,002,170 A    3/1991   Parsons et al.
(Continued)

FOREIGN PATENT DOCUMENTS

EP    0129417 A2    12/1984
EP    1593869 A1 *  11/2005    ............. F16D 23/12
(Continued)

OTHER PUBLICATIONS

Definition of along, Google Search, Dec. 17, 2020 (Year: 2020).*
Definition along, Dictionary.com, Dec. 17, 2020 (Year: 2020).*

*Primary Examiner* — Vinh Luong
(74) *Attorney, Agent, or Firm* — Taft Stettinius & Hollister LLP; Derek B. Lavender

(57) ABSTRACT

A clutch assist apparatus that has a casing, a controller, a position sensor that communicates with the controller to identify the position of a hand lever, a motor controlled by the controller and coupled to the casing, a cable pulling lever pivotally coupled to the casing about a rotation axis and configured to be coupled to a clutch cable, the cable pulling lever being movable between a first position and a second position. Wherein, the cable pulling lever selectively transitions a clutch assembly between an engaged position when the cable pulling lever is in the first position and a disengaged position when the cable pulling lever is in the second position. Further wherein, the cable pulling lever is movable between the first position and the second position by either the motor or the hand lever.

17 Claims, 10 Drawing Sheets

(51) Int. Cl.
*F16D 28/00* (2006.01)
*F16D 48/06* (2006.01)

(52) U.S. Cl.
CPC .............. *F16D 2500/3146* (2013.01); *F16D 2500/70424* (2013.01)

(58) Field of Classification Search
CPC ... F16D 2500/3146; F16D 2500/70424; A47L 11/4075; B25F 5/02; E04F 21/248; Y10T 16/498; Y10T 16/476
See application file for complete search history.

(56) References Cited

U.S. PATENT DOCUMENTS

| | | | |
|---|---|---|---|
| 5,267,635 A | 12/1993 | Peterson et al. | |
| 5,353,902 A | 10/1994 | Flowtow et al. | |
| 5,413,200 A | 5/1995 | Hirata | |
| 6,348,023 B1 | 2/2002 | Martelli | |
| 7,150,348 B2 | 12/2006 | Peppard et al. | |
| 7,451,864 B2 | 11/2008 | Kosugi | |
| 7,478,714 B2 | 1/2009 | Zenno | |
| 7,635,054 B2 | 12/2009 | Kosugi et al. | |
| 8,011,489 B2 | 9/2011 | Takeuchi | |
| 2006/0128527 A1 | 6/2006 | Zenno | |
| 2006/0161325 A1 | 7/2006 | Jiang | |
| 2006/0169561 A1 | 8/2006 | Kosugi | |
| 2006/0169569 A1 | 8/2006 | Ooishi et al. | |
| 2007/0079664 A1* | 4/2007 | Hajek | B62K 11/14 74/543 |
| 2007/0199755 A1 | 8/2007 | Takeuchi | |
| 2007/0244617 A1 | 10/2007 | Zenno | |
| 2008/0078641 A1 | 4/2008 | Iwashita | |
| 2011/0284339 A1 | 11/2011 | Caputa | |
| 2016/0281802 A1* | 9/2016 | Lawson | B62K 23/06 |
| 2016/0288864 A1* | 10/2016 | Kajihara | F16D 48/068 |

FOREIGN PATENT DOCUMENTS

| | | | |
|---|---|---|---|
| GB | 2066919 A | 7/1981 | |
| JP | 2005248976 A | 9/2005 | |
| WO | WO2004065812 A1 | 9/2004 | |
| WO | WO 2010010581 A1 * | 1/2010 | ............ F16D 13/52 |

* cited by examiner

ELECTRONIC CLUTCH ASSIST APPARATUS

CROSS-REFERENCE TO RELATED APPLICATIONS

This application is a national phase entry of PCT/US18/45757 filed on Aug. 8, 2018 which claims the benefit of U.S. Provisional Application No. 62/542,753 filed Aug. 10, 2017 and U.S. Provisional Application No. 62/563,132 filed Sep. 26, 2017 titled "ELECTRONIC CLUTCH ASSIST APPARATUS."The disclosures of which are hereby incorporated herein in their entirety.

FIELD OF THE DISCLOSURE

The present disclosure relates to a clutch assist mechanism, and in particular, to an electronic assist for a hand clutch.

BACKGROUND OF THE DISCLOSURE

Many motor vehicles have a clutch assembly with a hand lever utilized to disengage a ground engaging wheel or wheels of the motor vehicle from a prime mover such as a gas engine. The user must engage the hand lever with sufficient force to disengage a clutch stack or the like of the clutch assembly. Often, disengaging the clutch stack takes approximately 50 pounds of force applied to a central portion of the lever. Engaging the clutch lever causes the user's hand to become tired and fatigued after repeated clutch lever pulls and is challenging for some users to pull comfortably.

Some clutch assemblies are entirely electronic and require electricity to power a motor or the like to disengage the clutch assembly, electronic clutch assemblies are unreliable when there is an issue with the electrical system of the motor vehicle. Accordingly, an entirely electronic clutch assembly may render the vehicle unuseable when the vehicle is experiencing electrical issues. Further, vehicles with entirely electronic clutch assemblies are often manufactured with the electronic components positioned in locations that are difficult to access. In these types of vehicles the user may not be able to easily or quickly switch from the entirely electronic clutch assembly to a mechanical clutch assembly because of the difficult locations of the electronic components.

Accordingly, there is a need for an electronic clutch assist apparatus that can be easily installed on a vehicle with a mechanical clutch assembly. Further, there is a need for an electronic clutch assist apparatus that can utilize an electronic clutching function while maintaining a mechanical link to the clutch assembly.

SUMMARY

One embodiment is a clutch assist apparatus that has a casing, a controller, a position sensor that communicates with the controller to identify the position of a hand lever, a motor controlled by the controller and coupled to the casing, a cable pulling lever pivotally coupled to the casing about a rotation axis and configured to be coupled to a clutch cable, the cable pulling lever being movable between a first position and a second position. Wherein, the cable pulling lever selectively transitions a clutch assembly between an engaged position when the cable pulling lever is in the first position and a disengaged position when the cable pulling lever is in the second position. Further wherein, the cable pulling lever is movable between the first position and the second position by either the motor or the hand lever.

In one example of this embodiment, the casing is positionable around a handlebar assembly.

In another example of this embodiment, the casing is removably coupled in a storage apparatus of a vehicle.

Yet another example of this embodiment includes a horn coupled to the motor along the rotation axis, the horn having a horn contact portion radially offset from the rotation axis, wherein the horn contact portion contacts the cable pulling lever to position the cable pulling lever in the second position when the controller directs power to the motor.

Another example of this embodiment has a lever arm pivotally coupled to the casing along the rotation axis and further being coupleable to the hand lever and a lever contact coupled to the lever arm at a portion radially offset from the rotation axis. Wherein, the lever contact portion contacts the cable pulling lever to rotate the cable pulling lever to the second position when the lever contact portion is in a contact position and when the lever arm is coupled to the hand lever in a depressed position. In one aspect of this example, the lever contact is movable into a bypass position wherein the lever contact will not contact the cable pulling lever in the bypass position. In another aspect of this example, the lever arm is integrally formed with the hand lever and the casing is coupled around a handlebar assembly. In yet another aspect of this example, the lever arm is coupleable to a lever cable that is coupleable to the lever, wherein the lever cable moves the lever arm as the lever is depressed.

Another embodiment of this disclosure has a clutch assist apparatus configured to be coupled to a handlebar assembly of a vehicle with a controller, a casing that is removably coupleable to the handlebar assembly, a hand lever pivotally coupled to the casing about a rotation axis, a position sensor that communicates with the controller to identify the position of the hand lever, a motor controlled by the controller and coupled to the casing, a cable pulling lever pivotally coupled to the casing about the rotation axis and configured to be coupled to a clutch cable, the cable pulling lever being movable between a first position and a second position. Wherein, the cable pulling lever is movable between the first position and the second position by either the motor or a hand lever.

One example of this embodiment has a horn coupled to the motor along the rotation axis, the horn having a horn contact portion radially offset from the rotation axis, wherein the horn contact portion contacts the cable pulling lever to position the cable pulling lever in the second position when the controller directs power to the motor. In one aspect of this example, when the position sensor identifies a depressed condition of the hand lever, the controller directs power to the motor.

Another example has a motor position sensor that communicates the position of the motor to the controller. In one aspect of this example the controller identifies the position of the hand lever with the position sensor and adjust the position of the motor to a corresponding position.

Yet another example has a lever arm pivotally coupled to the casing along the rotation axis and further being coupled to the hand lever and a lever contact coupled to the lever arm at a portion radially offset from the rotation axis. Wherein, the lever contact portion contacts the cable pulling lever to rotate the cable pulling lever to the second position when the lever contact portion is in a contact position and when the lever arm is coupled to the hand lever in a depressed position.

Another embodiment is a system for assisting in clutch position management that includes a vehicle having a clutch assembly with an engaged position and a disengaged position, a handlebar assembly with a hand lever coupled thereto, the hand lever being coupled to the clutch assembly through an electronic clutch assist apparatus, the electronic clutch assist apparatus having a controller in communication with a motor and a position sensor, a clutch engaging lever pivotally coupled to a casing, the clutch engaging lever being coupled to the clutch assembly to transition the clutch assembly between the engaged position and the disengaged position, and a horn arm pivotally coupled to the casing and being movable by the motor, the horn arm configured to selectively contact the clutch engaging lever, a lever arm pivotally coupled to the casing and further coupled to the hand lever, the lever arm configured to selectively contact the clutch engaging lever. Wherein, in a first configuration the horn arm alone contacts the clutch engaging lever to transition the clutch assembly to the disengaged position and in a second configuration the lever arm alone contacts the clutch engaging lever to transition the clutch assembly to the disengaged position.

In one example of this embodiment in a third configuration both the horn arm and the lever arm contact the clutch engaging lever to transition the clutch assembly to the disengaged position.

In another example in the first configuration the motor rotates the horn arm responsive to movement of the hand lever identified by the position sensor.

In yet another example the vehicle has a clutch cable routed from the clutch assembly to the electronic clutch assist device. In one aspect of this example, the electronic clutch assist device is coupled to the handlebar assembly. In yet another aspect, the electronic clutch assist device is stored in a storage compartment of the vehicle and has a lever cable coupled to the lever arm on one end and to the hand lever on the other.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
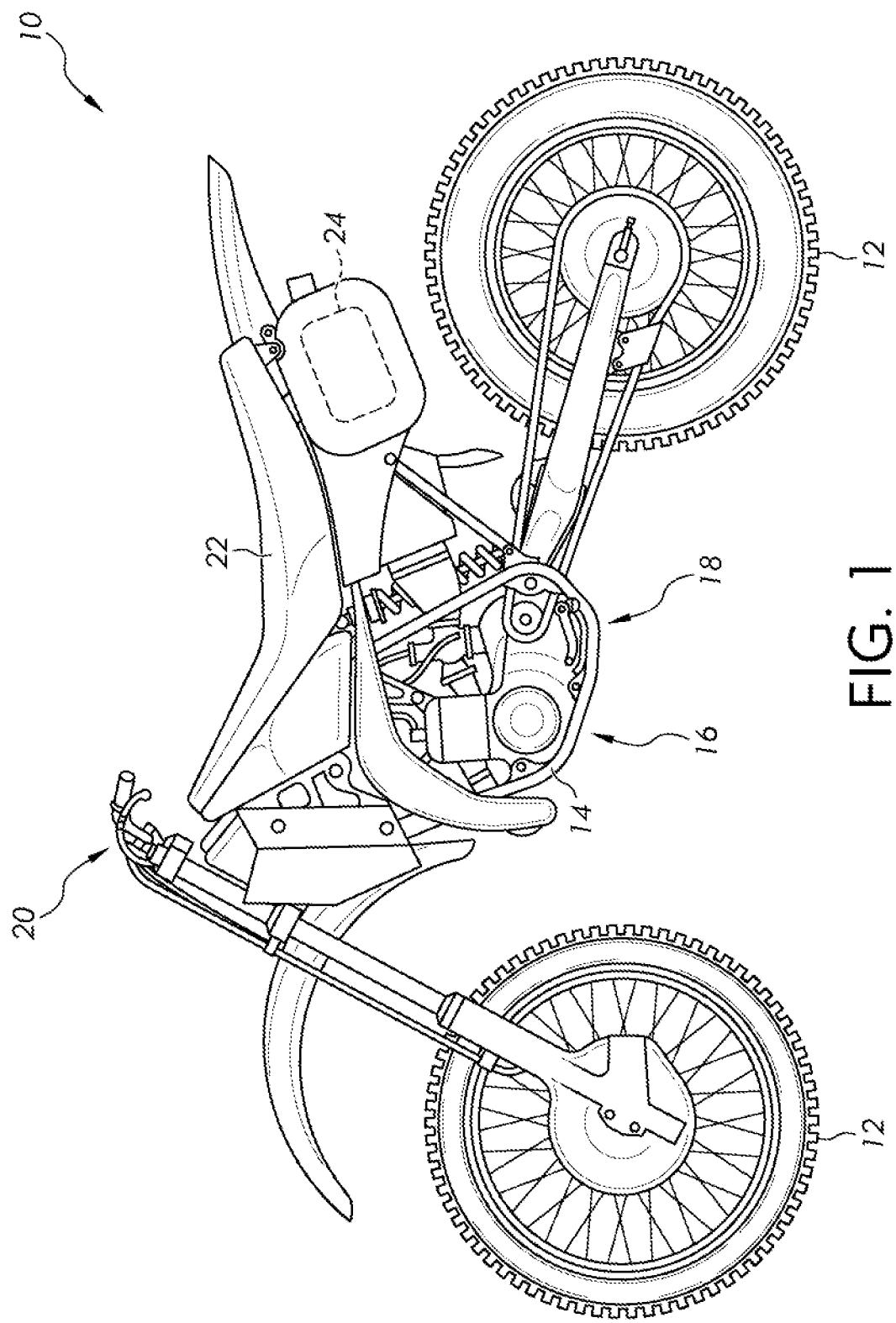
FIG. 1 is a side view of a vehicle.

Referring now to the FIG. 1, a vehicle 10 is illustrated. The vehicle may have wheels 12 coupled to a frame or chassis 14. At least one of the wheels 12 may be selectively coupled to a prime mover 16 or the like to provide a torque thereto. In one non-exclusive example, torque may be transferred from the prime mover 16 to the at least one wheel 12 via a chain, driveshaft, or belt as is known in the art.

The vehicle may have a transmission that is selectively couples the at least one wheel 12 to the prime mover 16 through a clutch assembly 18. The clutch assembly 18 may transition between an engaged position 170 where torque is transferred from the prime mover 16 to the at least one wheel 12 and a disengaged position 180 wherein torque is not transferred from the prime mover 16 to the at least one wheel 12.

A handlebar assembly 20 may also be coupled to the chassis as part of a steering and control system. The handlebar assembly 20 may have a brake control, a throttle control, and a clutch assembly control positioned thereon. Accordingly, a user may become positioned on a seat 22 of the vehicle 10 and engage the handlebar assembly 20 to control the speed and direction of the vehicle 10 among other things.

While FIG. 1 illustrates a two-wheeled vehicle, this disclosure is not limited to such an embodiment. Rather, any vehicle that utilizes a clutch assembly that is selectively engaged by a user is considered. More specifically, four-wheeled vehicles such as quads or the like can also implement the teachings of this disclosure. Accordingly, this disclosure considers applying the teachings discussed herein to any type of vehicle with a clutch assembly.

Figure 2A:
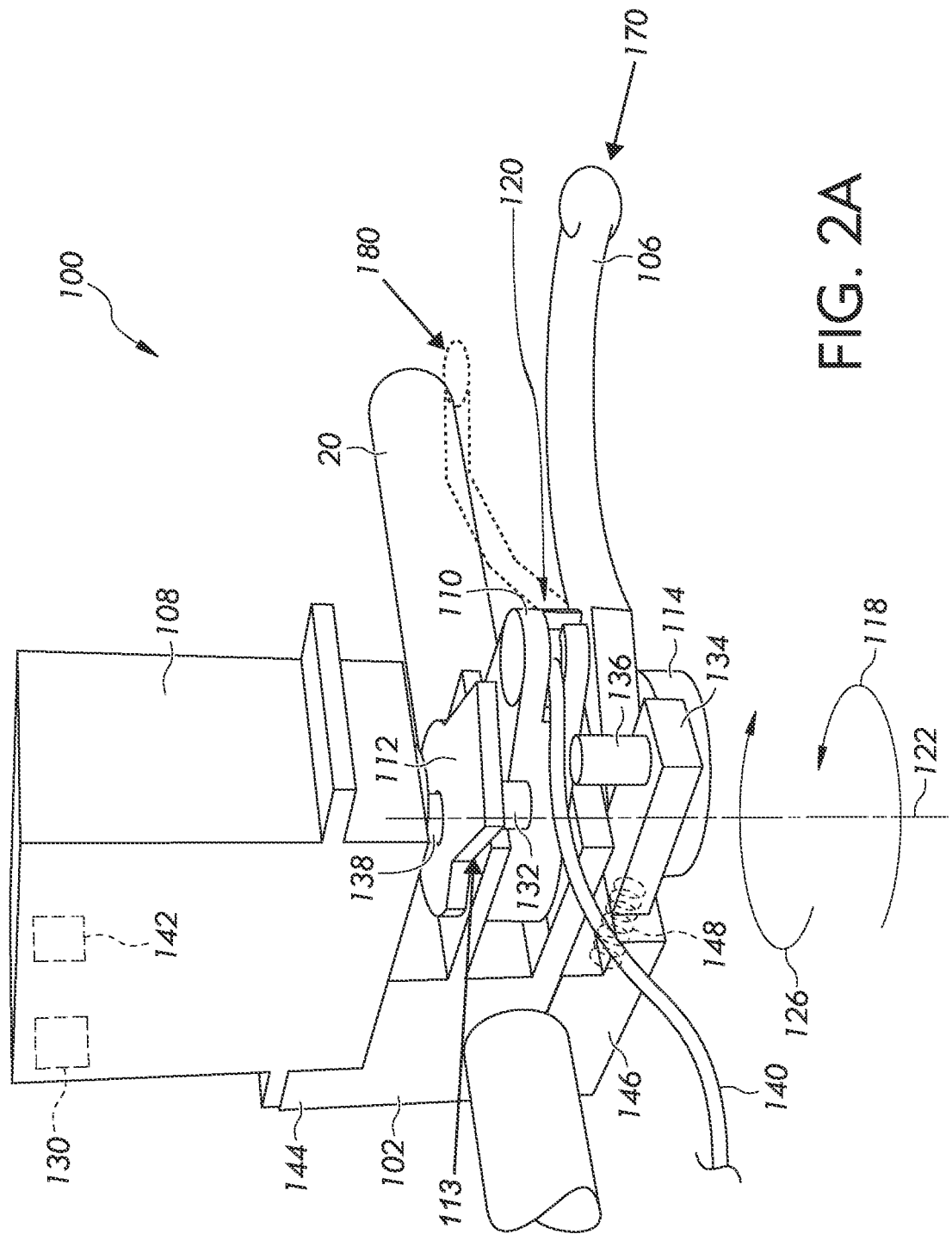
FIG. 2A is an elevated perspective view of a clutch assist apparatus with a lever contact in a contact position.

Referring now to FIG. 2A, a clutch assist apparatus 100 is shown coupled to the handlebar assembly 20. The clutch assist apparatus may be configured to reduce the force needed to disengage the clutch assembly 18 of the vehicle as described herein. More specifically, the clutch assist apparatus 100 may have a casing 102 that is coupleable to the handlebar assembly 20 or the like. In one non-exclusive example, the casing 102 may mount at a location that is typical for a hand clutch of the vehicle 10.

The clutch assist apparatus 100 may include a clutch engaging lever or hand lever 106, a servo or motor 108, a cable pulling lever 110, a horn 112, a position sensor 114, a control module or controller 130, and a spring to return the hand lever to a neutral position. In one embodiment, the horn 112 may have a horn arm 113 having a horn contact portion 132 that can engage the cable-pulling lever 110. Similarly, a lever arm 134 may be coupled to the hand lever 106 to rotate therewith and have a lever contact 136 that may be positioned to engage the cable-pulling lever 110 when the hand lever 106 is engaged.

In the non-exclusive embodiments shown, the hand lever 106 is connected to the position sensor 114 and rotates within the casing 102. Further, when the hand lever 106 rotates, the position sensor 114 may identify the rotation. In one non-exclusive example, the position sensor 114 may be a potentiometer rotationally coupled to the hand lever 106 via a shaft. When the user's hand pulls the hand lever 106 towards the handlebar assembly 20, the hand lever 106 rotates the potentiometer, which sends an input signal to the controller 130. Responsive to the input signal from the position sensor 114, the controller 130 sends a signal to the motor 108 or a motor controller, thereby engaging the motor 108 and causing it to rotate counter clockwise 118 about a rotation axis 122.

While a potentiometer is specifically described herein with reference to the position sensor 114 this disclosure considers other types of sensors as well. More specifically, any type of sensor capable of identifying the rotational movement of the hand lever 106 about the rotation axis 122 could be used. Accordingly, this disclosure considers any type of sensor known in the art to be utilized for the position sensor 114.

The horn 112 is rotationally coupled to the motor 108 via a motor shaft 138 and pushes the cable-pulling lever 110 with the horn contact portion 132 when the motor 108 is engaged by the controller 130. The cable-pulling lever 110 is pivotally coupled to the casing 102 at a first end and coupled to a clutch cable 140 at a second end 120. Accordingly, the cable-pulling lever 110 may rotate counter clockwise 118 about the rotation axis 122 relative to the casing 102 when the horn 112 presses against the cable-pulling lever 110 and thus pulls the clutch cable 140 to transition the clutch assembly 18 from the engaged position to the disengaged position.

In one aspect of this disclosure, electric power may be supplied to the motor 108, controller 130, and potentiometer 114 by a stator, a battery, or any other known power source. In one embodiment, the clutch assist apparatus 100 utilizes a typical power source for the vehicle while another embodiment utilizes a power source dedicated to the clutch assist apparatus 100.

In the embodiment illustrated in FIG. 2A, the hand lever 106, cable pulling lever 110, and motor 108 are all positioned to pivot about the rotation axis 122. In one non-exclusive example, the position sensor 114 uses a pulse width modulation or other similar signal to communicate a desired angle of rotation to the controller 130. In turn, the controller 130 sends a signal to rotate the motor 108 to a corresponding angle. More specifically, the controller 130 may identify a rotation of the hand lever 106 relative to a neutral position by monitoring the position sensor 114.

Figure 3A:
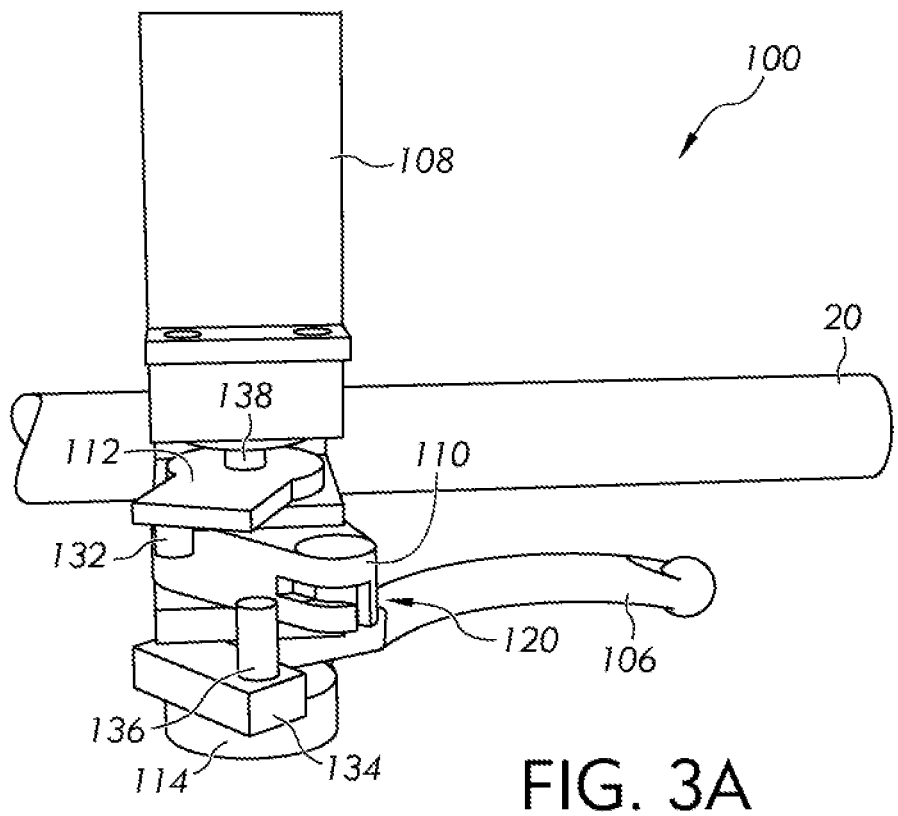
FIG. 3A is an elevated perspective view of the clutch assist apparatus of FIG. 2A in a second configuration.

When the controller 130 identifies rotation of the hand lever 106, it may then engage the motor 108 to rotate a corresponding degree as well. As the motor 108 rotates, the horn contact portion 132 may contact the cable pulling lever 110 to transition the cable pulling lever 110 from the first position (illustrated in FIG. 2A) to a second position (illustrated in FIG. 3A).

While pulse width modulation has been described herein, a person having skill in the art understands that any type of signal of varying intensity could be used. More specifically, instead of using pulse width modulation, the position sensor could alter a current sent to the controller 130 depending on the location of the hand lever 106. Further still, in a different embodiment the position sensor could vary the voltage sent to the controller 130. Accordingly, any method of modifying a signal could be used and this disclosure is not limited to any particular one.

In one aspect of this disclosure, the controller 130 may also monitor a motor position sensor 142 positioned to identify the angular orientation of the motor 108. In this embodiment, the controller 130 may identify the position of the hand lever 106 with the position sensor 114 as described above, and then move the motor 108 until the motor position sensor 142 indicates the horn is within an angular threshold that corresponds with the hand lever 106 position. As one non-exclusive example, the position sensor 114 may indicate to the controller 130 that the hand lever 106 has rotated X degrees about the rotation axis 122. Then, the controller 130 may direct the motor 108 to move about X degrees responsive to the movement of the hand lever 106. Further, the controller 130 may monitor the motor position sensor 142 to ensure the motor has rotated about X degrees.

In one aspect of this disclosure, the controller 130 may identify motor angle threshold values that correspond with each hand lever angle. More specifically, if the hand lever 106 moves X degrees, the controller 130 may monitor the motor position sensor 142 and move the motor 108 until the motor position sensor 142 indicates the motor angle is about X degrees plus or minus one degree for example. Accordingly, the controller 130 may monitor the angles of both the hand lever 106 and the horn 112 by monitoring the position sensor 114 and the motor position sensor 142.

In one non-exclusive example, the casing 102 mounts directly to the handlebar assembly 20 by coupling a first casing portion 144 to a second casing portion 146 thereby clamping the casing 102 to the handlebar assembly 20. However, any method of clamping an object to a tubular structure could be used, and this disclosure is not limited to the method described herein.

One embodiment includes a hand lever return spring 148. The hand lever return spring 148 applies a biasing torsional force to the hand lever 106 in a clockwise direction 126. When the user is not applying a force to the hand lever 106, the hand lever return spring returns the hand lever 106 to a neutral position as illustrated in FIG. 2A. In one embodiment, the hand lever return spring 148 is substantially less than the force required to disengage the clutch assembly 18. More specifically, as described above, some clutch levers may require about fifty pounds of force to disengage the clutch assembly 18, thereby requiring a similar force to maintain the clutch in the disengaged state and have a similar return force. The hand lever return spring 148 may require a force substantially less than fifty pounds to overcome the springed return force. In other words, the hand lever return spring 148 may determine the force required by the user to disengage the clutch assembly via the clutch assist apparatus 108 when the hand lever 106 is not mechanically disengaging the clutch assembly.

In one embodiment, when the clutch assist apparatus 100 is powered and functioning properly, the clutch disengage force at the hand lever 106 is dictated by the hand lever return spring 148. In this embodiment, the hand lever return spring 148 can be designed to require any amount of force. In one embodiment, the hand lever return spring 148 may require one pound of force to begin rotating the hand lever 106 and thereby rotating the position sensor 114 and the motor 108. In a different embodiment, the hand lever return spring 148 could require twenty pounds of force. In yet another embodiment, the hand lever return spring 148 could require eighty pounds of force. Further still, in one embodiment the hand lever return spring 148 could be adjustable by the user to allow the user to select hand lever return force that is most suitable for that user.

The hand lever return spring 148 may be any type of spring capable of resisting rotation of the hand lever 106 about the rotation axis 122. More specifically, the spring 148 may be a tension spring as illustrated in FIG. 2A. Alternatively, the hand lever returns spring 148 could be a compression spring if positioned on the proper side of the rotation axis 122. Further still, the hand lever return spring could be a torsional spring defined about the rotation axis 122. Accordingly, many different types of springs and spring locations are considered herein, and this disclosure is not limited to the particular springs and locations illustrated herein.

One aspect of the present embodiment includes the ability of the device 100 to pull the cable mechanically in the event that the electrical system fails or if electrical power is not turned on. The hand lever 106 has lever contact 136 or other engagement surface that will press upon the cable pulling lever 110 as the hand lever 106 is pulled. There may be a gap 402 (FIG. 4) between the lever contact 136 and the cable-pulling lever 110 when the hand lever 106 is in the neutral position. The gap 402 may allow for lag time between the speed the hand lever 106 is pulled and speed of the motor 108. However, the gap 402 is also small enough to allow the hand lever 106 to fully disengage the clutch assembly 18 by pressing upon the cable-pulling lever 110.

The horn 112 is positioned relative to the cable-pulling lever 110 in a way that allows the cable-pulling lever 110 to rotate even though the motor 108 is not rotating the horn 112. In other words, if the motor 108 fails to timely disengage the clutch assembly when the user is applying a torsional force to the hand lever 106 in the counter clockwise direction 118, the lever contact 136 will contact the cable-pulling lever 110 and thereby disengage the clutch assembly 18 via the user applied torque on the hand lever 106.

Figure 2B:
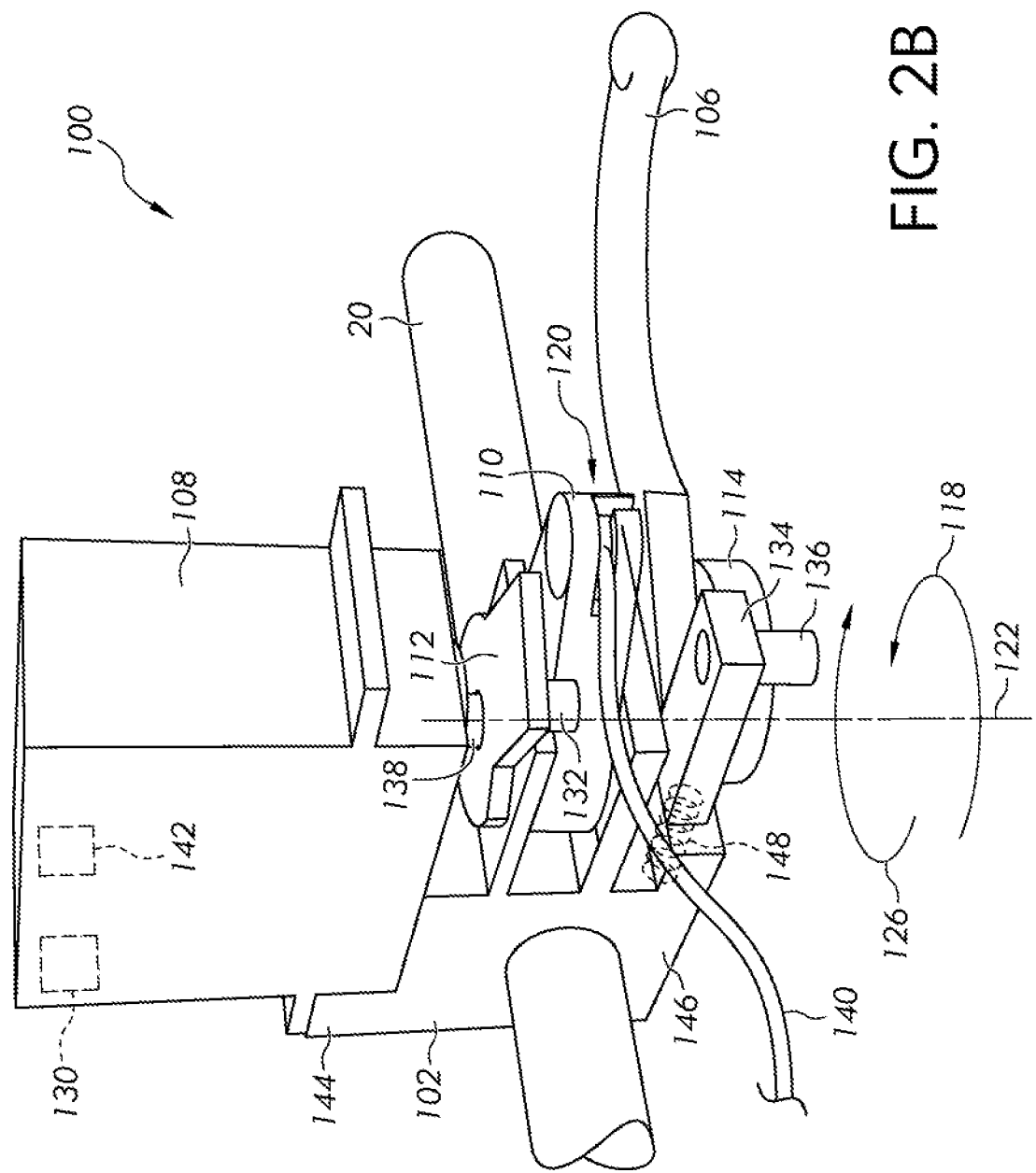
FIG. 2B is an elevated perspective view of the clutch assist apparatus of FIG. 2A with the lever contact in a bypass position.

In another example of this embodiment, the lever contact 136 may be selectively positioned adjacent to the cable-pulling lever 110. In this example, the user may position the lever contact 136 in a first position (as illustrated in FIG. 2A) or a second position (as illustrated in FIG. 2B). When the lever contact is in in the first position, the lever contact 136 contacts the cable-pulling lever 110 when the hand lever 106 rotates in the counter clockwise direction 118. Alternatively, when the lever contact 136 is in the second position, the lever contact 136 does not contact the cable-pulling lever 110 when the hand lever 106 rotates in the counter clockwise direction 118.

Accordingly, when the lever contact 136 is in the first position of FIG. 2A, the lever contact 136 acts upon the cable-pulling lever 110 when the hand lever 106 is pulled in order to manually disengage the clutch without use of the motor 108. The user may position the lever contact 136 in the first position when the motor 108 is not providing adequate power to disengage the clutch assembly 18. In one non-exclusive example, this is useful if the user wants to disengage the clutch assembly 18 when the battery cannot provide enough power to the motor to disengaged the clutch with the horn 112. When the lever contact 136 is in the first position, it allows the operator to use the hand lever 106 as a conventional clutch lever.

In one aspect of this disclosure, the motor 108 provides the exclusive force for pulling the clutch cable 140. More specifically, the position sensor 114 measures the angular displacement of the hand lever 106 and moves the motor 108 and related cable pulling lever 110 a proportionate amount as described above. For example, if the potentiometer 114 identifies that the hand lever 106 has moved fifteen degrees, the motor 108 my correspondingly rotate the horn 112 about fifteen degrees.

In another aspect of this disclosure, the motor 108 is coupled directly on the handlebar assembly 20. More specifically, the motor 108 may be coupled to the casing 102 which is clamped onto the handlebar assembly 20. In this configuration, the clutch assist apparatus 100 is configured to be used with the existing stock clutch cable 140. In other words, the user may easily implement the clutch assist apparatus 100 simply by removing the clutch cable 140 from the stock clutch hand lever assembly and removing the stock clutch hand lever assembly from the handlebar assembly 20. Next, the user may add the clutch assist apparatus 100 to the handlebar assembly 20 and coupling the stock clutch cable 140 to the second end 120 of the cable pulling lever 110. Next, the user may couple the clutch assist apparatus 100 to the handlebar assembly 20 and plug in a power connector to a power source. In short, the clutch assist apparatus 100 can be installed simply by coupling the stock clutch cable 140 thereto and connecting a power connector.

Figure 5A:
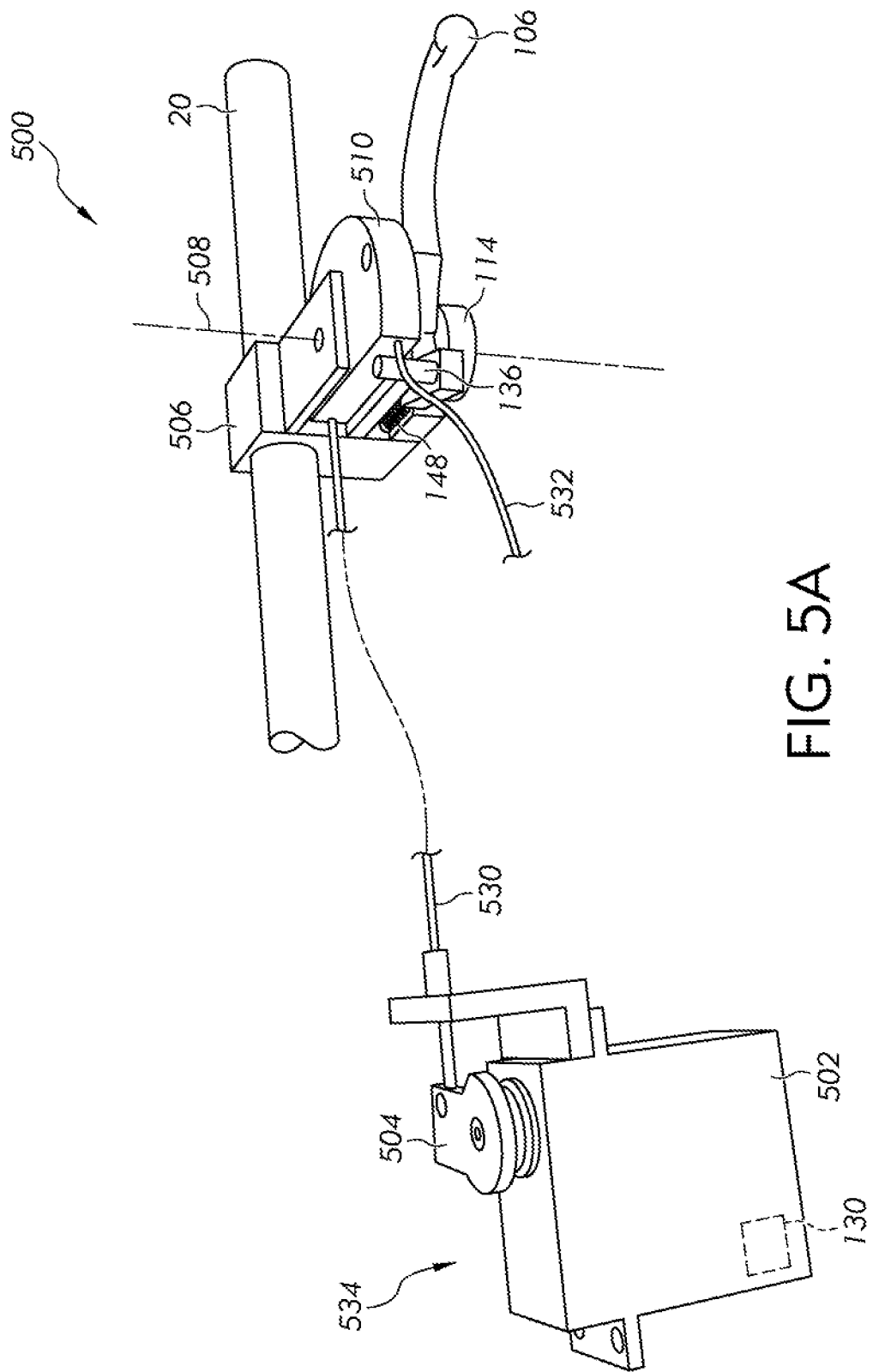
FIG. 5A is an elevated perspective view of another embodiment of a clutch assist apparatus.
Figure 5B:
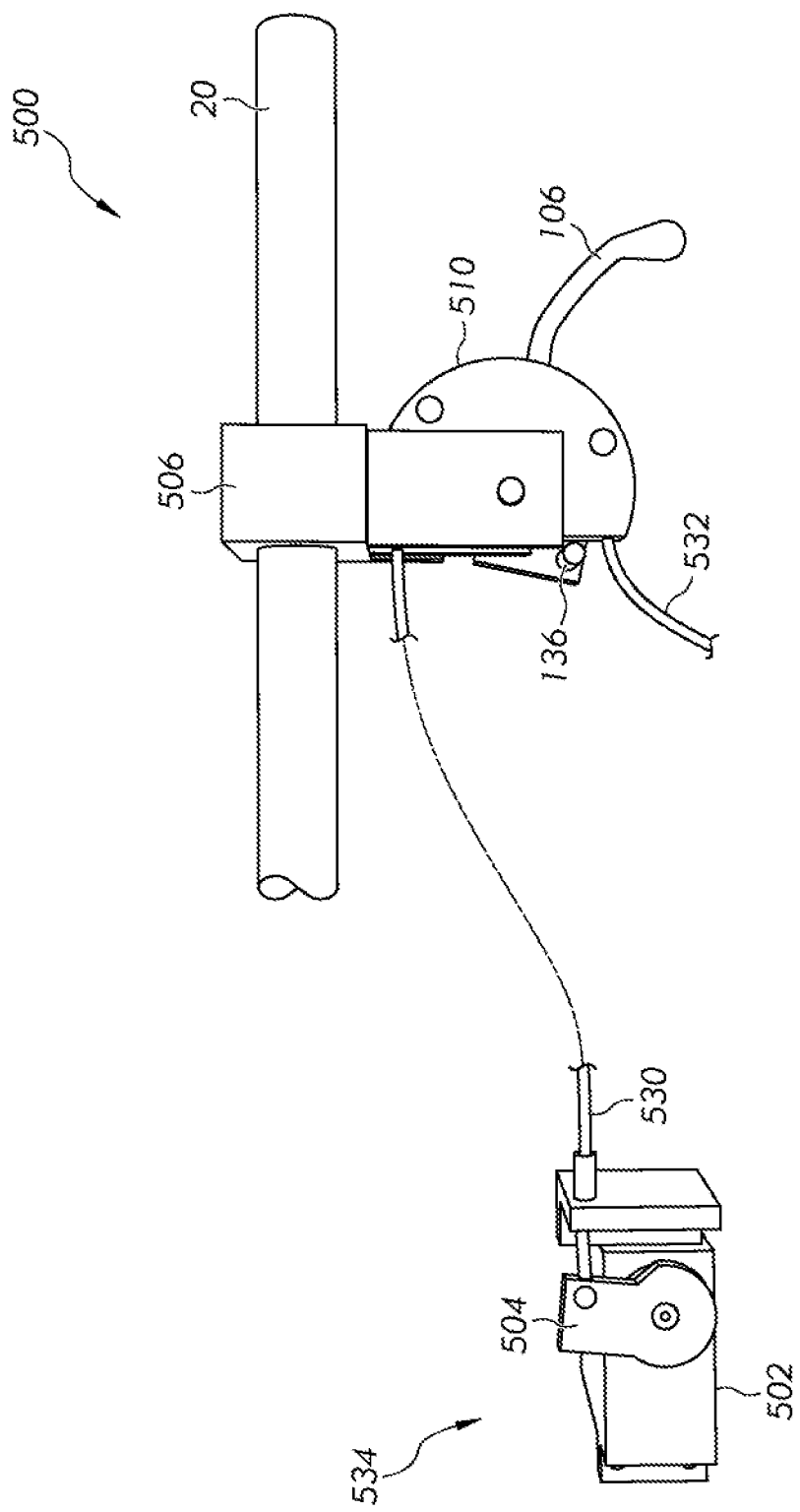
FIG. 5B is a top view of the clutch assist apparatus of FIG. 5A.

Referring now to FIGS. 5a and 5b, another embodiment of the present disclosure may have a remotely mounted motor configuration 500. More specifically, the remote configuration 500 shown consists of a hand lever 106, a remote motor 502, a cable pulling lever 510, a remote horn 504 that pulls a motor cable 530, a position sensor 114, a controller 130, and a lever return spring 148 to return the hand lever 106 to the engaged position.

The hand lever 106 is connected to the position sensor 114 and rotates on a bolt or the like on a clutch perch 506. When the user's hand pulls the hand lever 106 towards the handlebar assembly 20, the hand lever 106 rotates the position sensor 114 which sends an input signal to the controller 130 as described in more detail above. The controller 130 sends a signal to the remote motor 502 causing it to rotate the remote horn 504, which pulls the motor cable 530. The motor cable 530 pulls the cable pulling lever 510 that is attached to the clutch perch 506 thereby rotating the cable pulling lever 510 about a lever axis 508. The cable pulling lever 510 is pulled at a first end by the motor cable 530 coming from the remote servo horn 504. A second end of the cable pulling lever 510 pulls upon a stock clutch cable 532 that in turn disengages the clutch assembly 18 of the vehicle 10.

This embodiment may function in substantially the same way as the embodiment shown and described above for FIGS. 2-4 except it is configured to position the remote motor 502 at a remote location instead of mounting it on the handlebar assembly 20. In this embodiment, power from the remote motor 502 acts upon the motor cable 530 and in turn the cable-pulling lever 510 to disengage the clutch assembly via the clutch cable 532. More specifically, instead of coupling the remote motor 502 directly to the handlebar assembly 20 to act on the cable pulling lever 510, this embodiment provides a remote motor assembly 534 that is configured to provide a tension to the motor cable 530 at a remote location on the vehicle 10. When the controller 130 instructs the remote motor 502 to disengage the clutch assembly 18 responsive to inputs from the position sensor 114 as described above, the remote motor 502 may rotate or otherwise engage to apply a tension to the motor cable 530, thereby rotating the cable pulling lever 510 and disengaging the clutch assembly 18 via the clutch cable 532.

In one aspect of this embodiment, slack in the motor cable 530 allows the cable pulling lever 510 to rotate even though the remote motor 502 is not rotating the cable pulling lever 510. In other words, the user may engage the hand lever 106 to rotate the cable-pulling lever 510 and slack in the motor cable 530 allows the user to engage the cable to the clutch assembly 532 even when the remote motor 502 is not powered.

Figure 3B:
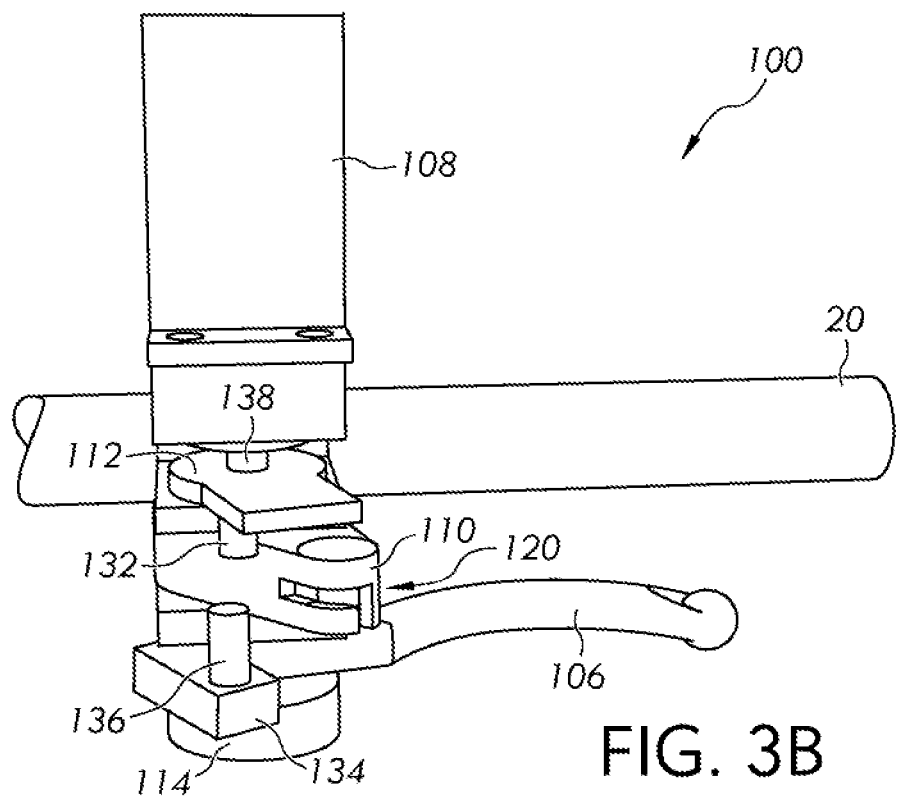
FIG. 3B is an elevated perspective view of the clutch assist apparatus of FIG. 2A in a first configuration.
Figure 4:
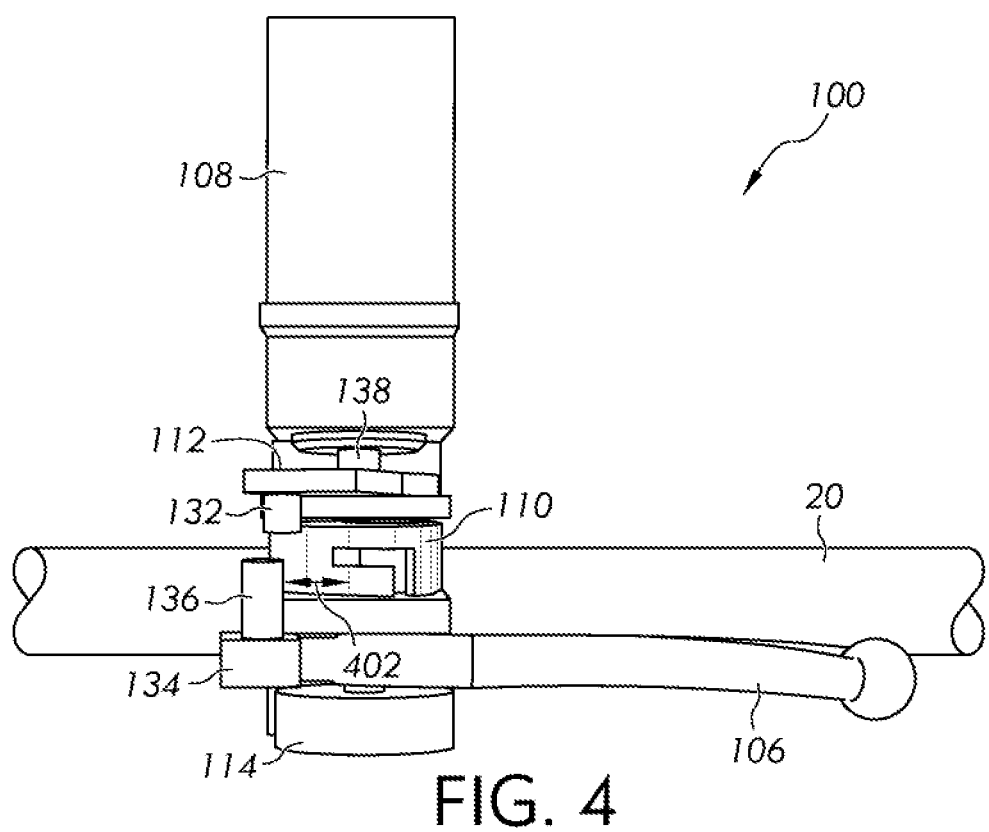
FIG. 4 is a front view of the clutch assist apparatus of FIG. 2A.

In other words, the lever contact of the hand lever 106 may contact the cable pulling lever 510 similarly to the cable pulling lever of FIGS. 2-4. However, in the embodiment of FIG. 5, the cable pulling lever 510 rotates to compress the motor cable 530 when the remote motor 502 is not powered or otherwise not functioning properly when the hand lever 106 is depressed. Further, the motor cable 530 can be sized to allow such compression without substantially restricting the cable pulling lever 510 from rotating.

Figure 6A:
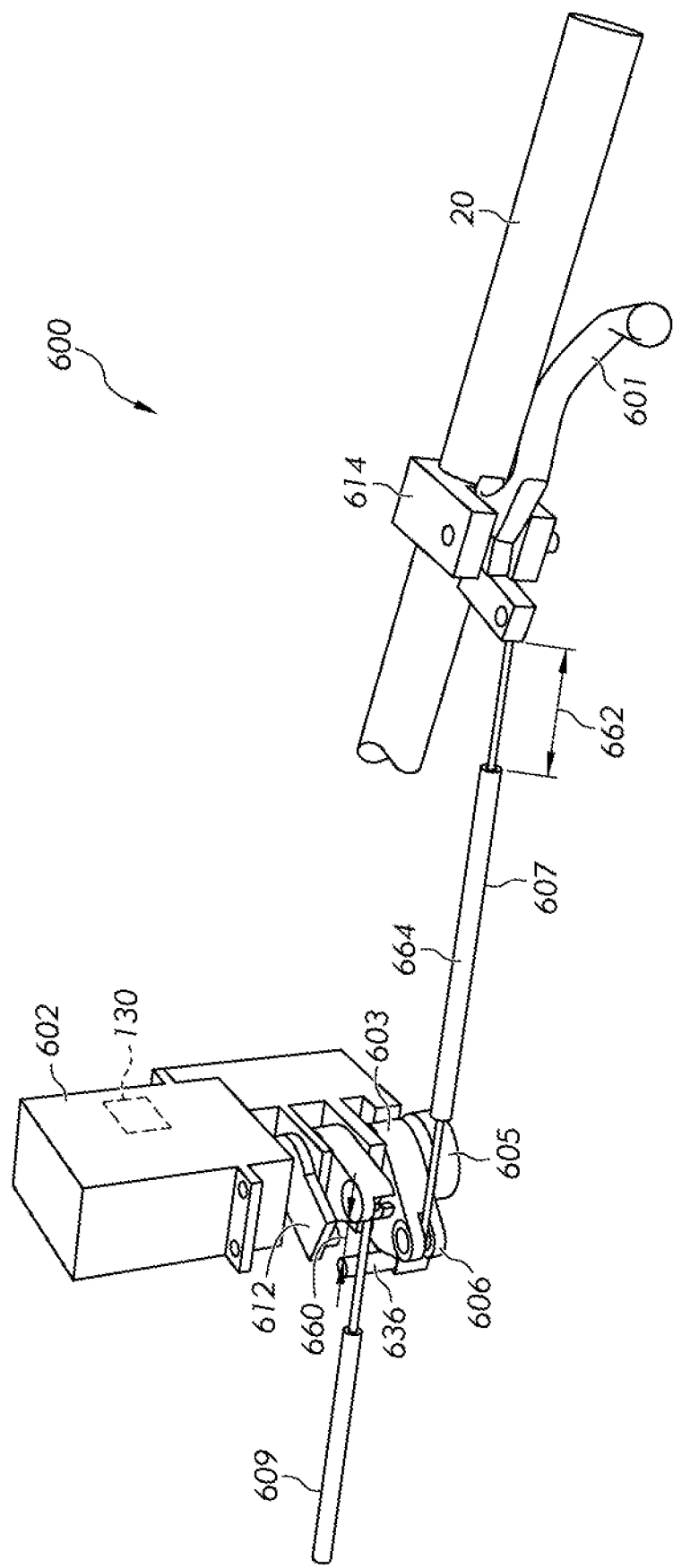
FIG. 6A is an elevated perspective view of another embodiment of a clutch assist apparatus.
Figure 6B:
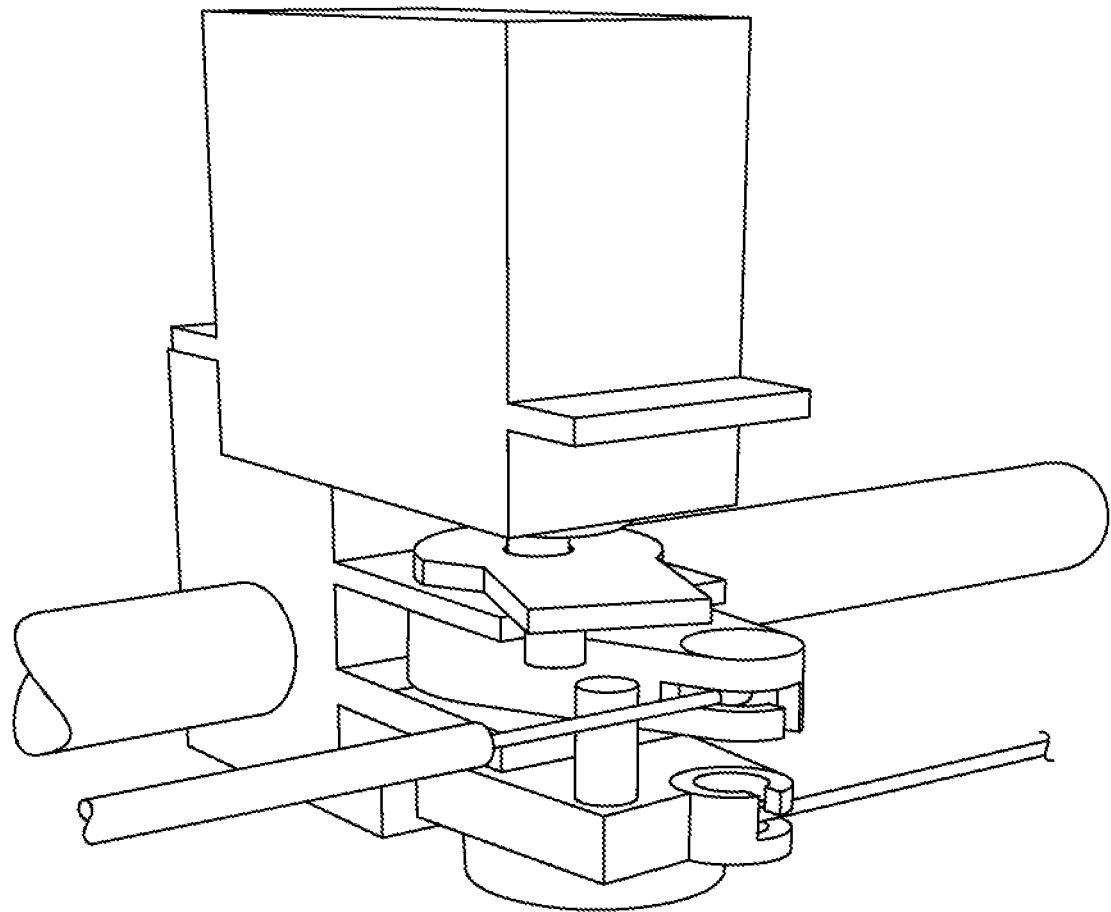
FIG. 6B an elevated perspective view of an isolated portion of the a clutch assist apparatus of FIG. 6A.

Referring now to FIGS. 6a and 6b, another embodiment of the present disclosure having a remote assembly 600 may have similar features as those described above. More specifically, a remote assembly 600 is shown that consists of a hand lever 601, a remote motor 602, a cable pulling lever 603, a remote horn 612, a remote position sensor 605, a controller 130, and a lever return spring to return the hand lever 601 to the neutral position. Similar to the previous embodiments, the remote horn 612 pushes the cable pulling lever 603 which may in turn pull a clutch cable 609 that is coupled to the clutch assembly 18.

The hand lever 601 is connected to a lever cable 607 and rotates on a bolt or the like on a clutch perch 614. In this embodiment, the hand lever 601, clutch perch 614, and lever cable 607 may all be substantially stock components of the vehicle 10. In other words, the remote assembly 600 may be specifically designed to utilize a hand lever, clutch perch, and lever cable that are typically used in a mechanical clutch assembly. However, with the remote assembly 600 coupled to the lever cable 607, when the user's hand pulls the hand lever 601 towards the handlebar assembly 20, the hand lever 601 pulls the lever cable 607 which rotates a remote lever arm (or any attached surface) 606.

The remote lever arm 606 may be rotationally coupled to a portion of the remote position sensor 605. When the remote lever arm 606 rotates, a portion of the remote position sensor 605 also rotates and sends an input signal to the controller 130 as described in more detail above. The controller 130 sends a signal to the remote motor 602 causing it to rotate the horn 612, which pushes the cable pulling lever 603, causing the cable pulling lever 603 to pull the clutch cable 609 similar to the above embodiments. The clutch cable 609 is connected to the clutch assembly 18 located on the vehicle's transmission as would be common for motorcycles and the like.

This embodiment may function in substantially the same way as the embodiment shown and described above except it is configured to position the motor remotely instead of mounting it on the handlebar assembly 20. In this embodiment, power from the remote motor 602 and attached horn 612 acts upon the cable pulling lever 603 to disengage the clutch assembly 18 via the clutch cable 609. When the remote motor 602 is instructed to disengage the clutch assembly 18 via the remote position sensor 605 as described above, the remote motor 602 may rotate or otherwise engage to apply a tension to the clutch cable 609, thereby rotating the cable pulling lever 603 and disengaging the clutch assembly 18 via the clutch cable 609.

In one aspect of this embodiment, the remote arm 606 has a remote lever contact 636 that is configured to engage a surface on the cable pulling lever 603 to manually move the cable pulling lever 603 in the event that the motor is powered off, malfunctioning, electric power is lost, or the motor is otherwise not properly engaging the cable pulling lever 603. This allows for manual clutch operation even in the event of motor failure or motor power off.

In one aspect of this embodiment, a gap 660 between the lever contact 636 and the cable pulling lever 603 can be reduced by increasing a cable housing gap 662 between an outer cable casing 664 and the clutch perch 614. In one non-exclusive example illustrated in FIGS. 7a and 7b, a clutch gap switch 700 may be positioned along the lever cable 607. The clutch gap switch 700 may have an inner member 701 and an outer member 703 slidably coupleable to one another. The outer member 703 may be coupled to the outer cable casing 664 and the inner member 701 may be coupled to the clutch perch 614. Further, the clutch gap switch 700 may have a through-hole there through allowing the clutch cable 607 to pass through the clutch gap switch 700 and be coupled to the hand lever 601.

Figure 7A:
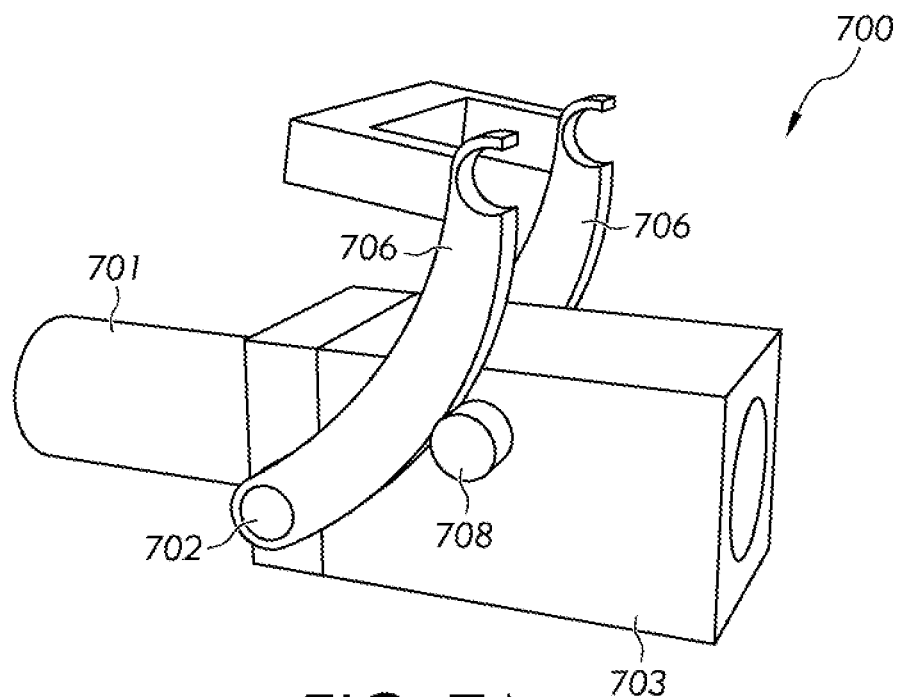
FIG. 7A is an elevated perspective view of a clutch gap switch in a first position.
Figure 7B:
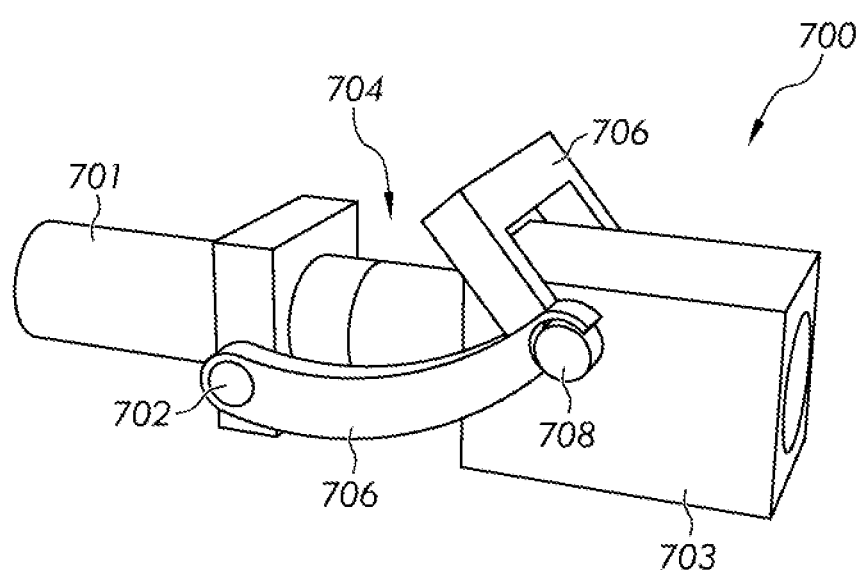
FIG. 7B is an elevated perspective view of the clutch gap switch of FIG. 7A in a second position.

In this embodiment, the clutch gap switch 700 is positionable in either a closed position 702 of FIG. 7A or an opened position 704 of FIG. 7B. In the closed position 702, the inner member 701 is substantially adjacent to the outer member 703, thereby allowing for additional slack in the lever cable 607. The additional slack in the lever cable 607 is addressed by the remote arm 606, allowing the remote arm 606 to pivot away from the cable pulling lever 603. By pivoting away from the cable pulling lever 603, the gap 660 between the remote arm 606 and the cable pulling lever 603 is increased.

This increased gap 660 may allow for more movement of the remote arm 606 prior to contacting the cable pulling lever 603 with the lever contact 636. In one aspect of this embodiment, it may be beneficial to increase this gap 660 in order to provide sufficient movement of the remote arm 606 to allow the position sensor 605 to detect and respond to the rotation of the remote arm 606. In other words, the position sensor 605 may require a minimum rotation before being detected by the controller 130. Increasing the gap 660 between the remote arm 606 and the cable pulling lever 603 may provide a sufficient gap size to allow the controller 130 to react to the rotation of the remote arm 606 before the lever contact 636 contacts the cable pulling lever 603.

Alternatively, when the gap switch 700 is in the opened position 704, the inner member 701 may be spaced from the outer member 703. In this configuration, the gap 660 between the remote arm 606 and the cable pulling lever 603 is reduced and the pin of the remote arm 606 is positioned closer to the cable pulling lever 603. The reduced gap 660 between the lever contact 636 and the cable pulling lever 603 results in a faster mechanical engagement of the remote contact 636 and the cable pulling lever 603 when the hand lever 601 is engaged by the user.

In this configuration, any rotation of the hand lever 601 may cause the pin to engage the cable pulling lever 603 before the position sensor 605 identifies rotation of the remote arm 606, thereby allowing the user to mechanically disengage the clutch assembly 18. In other words, the user may transfer the gap switch 700 from the closed position 702 to the opened position 704 when the user wants to mechanically engage the clutch assembly.

In one embodiment, the gap switch 700 may have a pivoting lock 706 pivotally coupled to the inner member 701. Further, the outer member 703 may have a boss 708 positioned to correspond with the pivoting lock 706. The boss 708 may provide a location for the pivoting lock 706 to selectively couple to the boss 708 to maintain the gap switch in the opened position 704. Further, the pivoting lock 706 may be selectively uncoupled from the boss 708 to transition the gap switch 700 to the closed position 702.

In one embodiment, the pivoting lock 706 may have two arms coupled to either side of the inner member 701 and correspond with two bosses 708 on either side of the outer member 703. Further, a bridge section may couple the two arms to one another around the outer member 703.

Alternatively, this gap on the cable casing could be increased by a wedge, a lever, a pulling force, a threaded coupler, or by any practical means for adjusting and maintaining a gap on a cable.

In one embodiment of the remote assembly 600, substantially all of the components of the assembly 600 are positioned in a saddlebag 24 or other storage apparatus or portable carrying assembly. In this embodiment, the stock clutch cable may be uncoupled from a clutch engagement arm on the clutch assembly 18 of the vehicle 10 and coupled to the remote arm 606. Further, the clutch cable 609 may be coupled to the clutch engagement arm of the motor vehicle in place of the stock clutch cable. The remote assembly 600 may then be coupled to a power source of the vehicle 10. Then, the portable carrying assembly can be coupled to the motor vehicle at a location that does not interfere with the user's operation of the motor vehicle. In one embodiment, the motor vehicle is a motorcycle and the portable carrying assembly is a saddlebag.

In another embodiment of the remote assembly 600, the stock clutch cable may be uncoupled from the stock clutch perch and coupled to the cable pulling lever 603. In this embodiment, the clutch cable 609 may be the stock clutch cable of the motor vehicle. The clutch cable 609 may be coupled to the clutch engagement arm on the motor vehicle on one end and coupled to the cable pulling lever 603 on the other end. Further, the lever cable 507 may be coupled to the remote arm 606 on one end and to the stock hand lever 601 on the other end. A person skilled in the relevant art understands that the stock clutch cable of the motor vehicle may be used as either the clutch cable 609 or the lever cable 607 and require only the addition of the alternative cable to install the remote assembly 600.

In yet another embodiment, any of the embodiments described herein may have an electrical connector that electrically couples the clutch assist apparatus to the electrical system of the motor vehicle. In this embodiment, the clutch assist apparatus may be connected to the motor vehicle by coupling the cables that correspond with the clutch assist apparatus to the vehicle and further coupling the electrical connector to the vehicle. In other words, the clutch assist apparatus may easily be coupled to, and removed from, the vehicle with minimal user interaction. This may allow the user to quickly and easily install and remove the second device 500 without requiring special tools. In yet another aspect of this disclosure, the clutch assist apparatus may utilize a dedicated battery to provide power thereto. Accordingly, any suitable method of powering the clutch assist apparatus is considered herein.

In one embodiment, the electric clutch is coupled to an input signal from an electronic control module (ECM) that collects input data from a throttle position sensor (TPS), tachometer, and/or speedometer. The ECM can control the clutch assist in a manner similar to an automatic clutch by engaging and disengaging the clutch assembly 18 based on engine speed, shift timing, and ground speed.

In yet another embodiment, the automatic hand clutch of this disclosure could be paired with a push button shifting mechanism to make a manual motor vehicle drive like a semi-automatic motor vehicle. Similarly, the automatic hand clutch of this disclosure could be paired with a push button shifting apparatus receiving commands from the ECM to result in a motor vehicle that drives like a fully automatic transmission because the clutching and shifting is done automatically by the ECM, through the electric clutch and the push button shifting apparatus.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A clutch assist apparatus, comprising:
   a casing;
   a controller;
   a position sensor that communicates with the controller to identify the position of a hand lever;
   a motor controlled by the controller and coupled to the casing;
   a cable pulling lever pivotally coupled to the casing about a rotation axis and configured to be coupled to a clutch cable, wherein the cable pulling lever moves between a first position and a second position; and
   a horn coupled to the motor along the rotation axis, the horn having a horn contact portion radially offset from the rotation axis;
   a lever arm pivotally coupled to the casing along the rotation axis and further being coupled to the hand lever; and
   a lever contact coupled to the lever arm at a portion radially offset from the rotation axis;
   wherein, the lever contact engages the cable pulling lever to rotate the cable pulling lever to the second position when the lever contact is in a contact position and when the lever arm is coupled to the hand lever in a depressed position;
   wherein, the cable pulling lever selectively transitions a clutch assembly between a torque transferring position when the hand lever is in an engaged position and the cable pulling lever is in the first position and a non-torque transferring position when the hand lever is in a disengaged position and the cable pulling lever is in the second position;
   further wherein, the cable pulling lever moves between the first position and the second position by either the motor or the hand lever;
   further wherein, the horn contact portion contacts the cable pulling lever to position the cable pulling lever in the second position when the controller directs power to the motor.

2. The clutch assist apparatus of claim 1, further wherein the casing is coupled to a handlebar assembly.

3. The clutch assist apparatus of claim 1, further wherein the casing is removably coupled to a storage apparatus of a vehicle.

4. The clutch assist apparatus of claim 1, further wherein the lever contact is configured to be moved into a bypass position wherein the lever contact will not contact the cable pulling lever in the bypass position.

5. The clutch assist apparatus of claim 1, further wherein the lever arm is integrally formed with the hand lever and the casing is coupled around a handlebar assembly.

6. The clutch assist apparatus of claim 1, further wherein the lever arm is coupled to a lever cable that is coupled to the hand lever, wherein the lever cable moves the lever arm as the hand lever is depressed.

7. A clutch assist apparatus configured to be coupled to a handlebar assembly of a vehicle, comprising:
   a controller;
   a casing that is removably coupled to the handlebar assembly;
   a hand lever pivotally coupled to the casing about a rotation axis;
   a position sensor that communicates with the controller to identify the position of the hand lever;
   a motor controlled by the controller and coupled to the casing;
   a cable pulling lever pivotally coupled to the casing about the rotation axis and configured to be coupled to a clutch cable, wherein the cable pulling lever moves between a first position and a second position;
   a lever arm pivotally coupled to the casing along the rotation axis and further being coupled to the hand lever; and
   a lever contact coupled to the lever arm at a portion radially offset from the rotation axis;
   wherein, the lever contact engages the cable pulling lever to rotate the cable pulling lever to the second position when the lever contact is in a contact position and when the lever arm is coupled to the hand lever in a depressed position;
   wherein, the cable pulling lever moves between the first position and the second position by either the motor or the hand lever.

8. The clutch assist apparatus of claim 7, further comprising a horn coupled to the motor along the rotation axis, the horn having a horn contact portion radially offset from the rotation axis, wherein the horn contact portion contacts the cable pulling lever to position the cable pulling lever in the second position when the controller directs power to the motor.

9. The clutch assist apparatus of claim 8, further wherein when the position sensor identifies a depressed condition of the hand lever, the controller directs power to the motor.

10. The clutch assist apparatus of claim 7, further comprising a motor position sensor that communicates the position of the motor to the controller.

11. The clutch assist apparatus of claim 10, further wherein the controller identifies the position of the hand lever with the position sensor and adjust the position of the motor to a corresponding position.

12. A system for assisting in clutch position management, comprising:
   a vehicle having a clutch assembly with an engaged position and a disengaged position;
   a handlebar assembly with a hand lever coupled thereto, the hand lever being coupled to the clutch assembly through an electronic clutch assist apparatus, the electronic clutch assist apparatus comprising:
      a controller in communication with a motor and a position sensor;
      a clutch engaging lever pivotally coupled to a casing, the clutch engaging lever being coupled to the clutch assembly to transition the clutch assembly between the engaged position and the disengaged position; and
      a horn arm pivotally coupled to the casing and configured to move by the motor, the horn arm configured to selectively contact the clutch engaging lever;
      a lever arm pivotally coupled to the casing and further coupled to the hand lever, the lever arm configured to selectively contact the clutch engaging lever;
   wherein, in a first configuration the horn arm alone contacts the clutch engaging lever to transition the clutch assembly to the disengaged position and in a second configuration the lever arm alone contacts the clutch engaging lever to transition the clutch assembly to the disengaged position.

13. The system of claim 12, further wherein in a third configuration both the horn arm and the lever arm contact the clutch engaging lever to transition the clutch assembly to the disengaged position.

14. The system of claim 12, further wherein in the first configuration the motor rotates the horn arm responsive to movement of the hand lever identified by the position sensor.

15. The system of claim 12, further wherein the vehicle has a clutch cable routed from the clutch assembly to the electronic clutch assist device.

16. The system of claim 15, further wherein the electronic clutch assist device is coupled to the handlebar assembly.

17. The system of claim 15, further wherein the electronic clutch assist device is stored on a storage compartment of the vehicle and has a lever cable coupled to the lever arm on one end and to the hand lever on the other.

* * * * *